(No Model.)

S. G. McFARLAND.
TRAP FOR WATER CLOSETS.

No. 302,667. Patented July 29, 1884.

Witnesses:
J. Staib
Chas. H. Smith

Inventor:
Samuel G. McFarland
per Lemuel W. Serrell
atty.

N. PETERS. Photo-Lithographer, Washington, D. C.

UNITED STATES PATENT OFFICE.

SAMUEL G. McFARLAND, OF NEW YORK, N. Y., ASSIGNOR TO THE J. L. MOTT IRON WORKS, OF SAME PLACE.

TRAP FOR WATER-CLOSETS.

SPECIFICATION forming part of Letters Patent No. 302,667, dated July 29, 1884.

Application filed December 3, 1883. (No model.)

*To all whom it may concern:*

Be it known that I, SAMUEL G. MCFARLAND, of the city and State of New York, have invented an Improvement in Traps for Water-Closets, of which the following is a specification.

This invention relates to a trap for the sewer-pipe of a character adapted to receive upon it the basin of a water-closet.

In water-closets where the trap is above the floor and beneath the basin it is difficult to ventilate such trap without the risk of the outlet becoming stopped or offensive from the material splashed over from the basin of the trap. I avoid this difficulty by making in the top part of the trap, behind the basin and above the dam, a lateral branch, or two lateral branches—one at each side—to one of which the ventilating-pipe is connected; and I make the descending leg of the trap to pass below the base of the trap, which rests upon the floor, in order that the hub at the upper end of the soil-pipe may be flush with the floor and receive such leg, thereby facilitating the calking of the joint.

Figure 1:
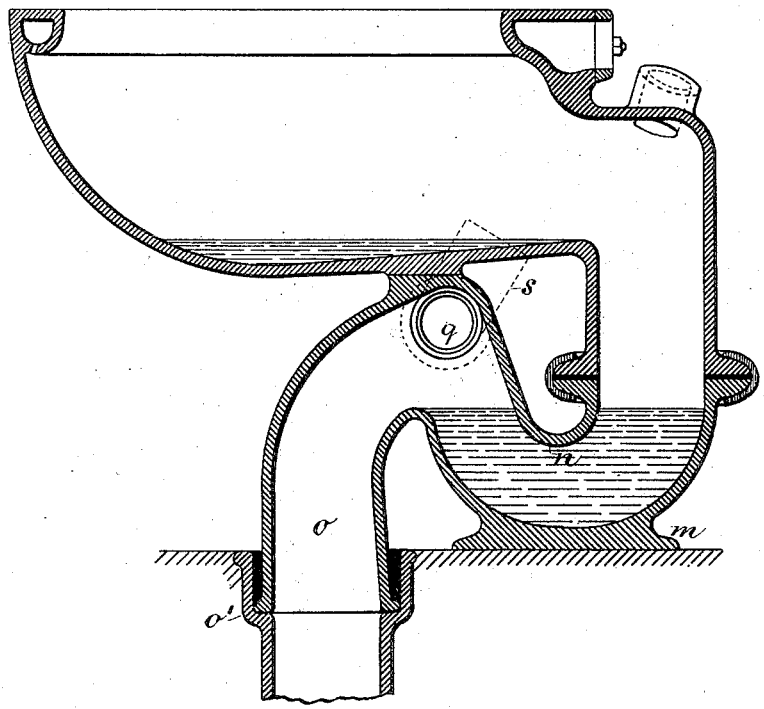
Figure 2:
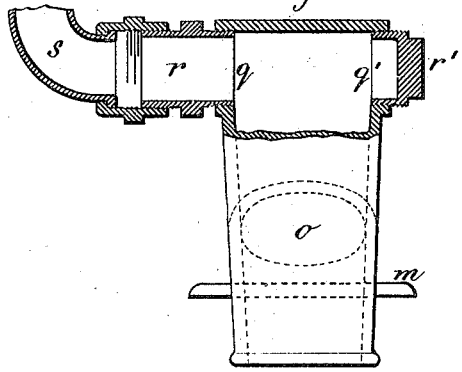

In the drawings, Figure 1 is a section of the trap and basin longitudinally, and Fig. 2 is a cross-section of the trap.

The closet-basin itself may be of the character shown; but this is not herein specially described, as the trap may be used with any basin whatever available. The top of the soil-pipe is preferably of metal. It is formed with the base *m* to rest upon the floor, the curved portion *n* that holds the water, and the descending leg *o*, that is united with the soil-pipe. At the upper part of the bend, between *o* and *n*, there are lateral openings *q q'*, into one of which is inserted a screw-thimble, *r*, and to either of these lateral openings the ventilating-pipe *s* is connected. This pipe *s* may be coupled by a screw-union, or united in any other convenient manner, and it is taken off from that side of the closet where it will pass the most directly to the ascending ventilating pipe or flue. The opening that is not used for the ventilating-pipe is to be closed by a screw-plug, *r'*.

By this construction of trap I am able to take off the ventilating-pipe in either direction, and the rush of water through the trap carries all solid matter across below the lateral opening, and there is no tendency for any accumulation at the ventilating-opening, and siphoning of the trap is effectually prevented, because the atmosphere is drawn into the soil-pipe immediately behind the water seal of the trap; hence the water will not be drawn out of the trap, and any movement of air, gases, or water in the soil-pipe will not cause an escape of smell into the room through the water seal of the trap.

In water-closets heretofore constructed having a trap above the floor it has been usual to allow the hub of the soil-pipe to extend above the floor. This is objectionable, as it is difficult to calk such joint.

I make the leg *o* of the trap to descend below the base *m*, so that the upper end of the hub *o'* of the soil-pipe will be level with the floor and can be easily calked after the closet is in place. In cases where the water-closet is not incased the hub *o'* will also be out of sight, and the appearance of the closet is improved.

I do not claim a sewer-pipe having a hub below the level of the floor and a trap having a discharge-pipe to enter the hub, as these have been used; but the discharge-pipe has been provided with a flange; hence the joint could not be calked.

The trap and water-closet basin and the lateral ventilating-pipe have all been made in one piece, as in my Patent No. 287,558; and I do not herein lay claim to any portion of the basin of the closet, the same being the subject of my application, Serial No. 91,049, filed April 9, 1883. In my present invention the trap is a separate article and independent of any particular basin.

I claim as my invention—

1. A water-trap having two lateral branch openings at the upper part of the trap, between the descending leg *o*, that connects with the soil-pipe, and the portion of the trap which retains the water, substantially as set forth.

2. A trap for water-closets, having a connecting-flange at one end and at the other end a descending leg to enter the upper end of the sewer-pipe, and a branch pipe passing out laterally at one side above the portion of the trap that retains the water, and between the same and the descending leg, substantially as set forth.

3. The water-closet trap having a base, $m$, to rest upon the floor, and the leg $o$, with its lower end below said base, so as to pass into the upper end of the soil-pipe below the floor, and without any flange above the floor, so that joint can be packed, substantially as set forth.

Signed by me this 28th day of November, A. D. 1883.

SAML. G. McFARLAND.

Witnesses:
MAX GOEBEL,
HENRY MORFORD.